United States Patent [19]

Tanaka et al.

[11] 4,296,133
[45] Oct. 20, 1981

[54] METHOD FOR PRODUCING BREAD

[75] Inventors: Kenji Tanaka, Kawagoe; Shigeru Endo, Tokyo, both of Japan

[73] Assignee: Nisshin Flour Milling Co., Ltd., Tokyo, Japan

[21] Appl. No.: 70,321

[22] Filed: Aug. 24, 1979

[51] Int. Cl.³ .................. A21D 2/08; A21D 8/02
[52] U.S. Cl. ............................. 426/23; 426/25; 426/653; 426/19
[58] Field of Search ................ 426/25, 23, 549, 653, 426/442, 19

[56] References Cited

U.S. PATENT DOCUMENTS 3,309,203  3/1967  Jensen .............................. 426/23
3,594,180  7/1971  Hulse et al. ...................... 426/25
3,934,040  1/1976  Smerak et al. .................. 426/23

Primary Examiner—Joseph M. Golian
Assistant Examiner—Elizabeth J. Curtin
Attorney, Agent, or Firm—Haseltine and Lake

[57] ABSTRACT

A method for producing bread is described which involves kneading a dough with an L-ascorbic acid, a dicarboxylic acid or salts thereof of the formula

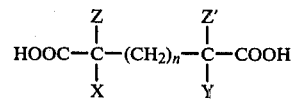

wherein n, X, Y, Z and Z' are as herein defined, cystine, methionine, alums and nicotinic acids, allowing the thus kneaded dough to ferment and then baking the thus fermented dough.

13 Claims, No Drawings

METHOD FOR PRODUCING BREAD

This invention relates to a method of producing breads which are of good quality.

There have conventionally been attempts to increase the volume of a bread to improve the nature of the inner and outer phases of the bread and to simultaneously improve its taste. For such a purpose, for example, L-ascorbic acid is added to dough. By the employment of such an additive, it is possible to increase the volume of bread to a certain extent but such an additive is not satisfactory in terms of the quality of bread to be obtained and production process.

As a result of extensive investigation, we have found that breads of extremely good quality can be obtained by employing in combination (a) an L-ascorbic acid and (b) an additive selected from divalent carboxylic acids having the general formula

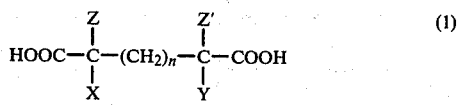

and salts thereof, wherein, n is 0 or 1, X denotes a hydrogen atom, an amino group or a hydroxyl group, Y represents amino or hydroxyl group, and each of Z and Z' is a hydrogen atom; or Z and X and/or Z' and Y represent, in a combined form, an oxygen atom, cystine, methionine, alums and nicotinic acids.

In the present specification, the term "bread" is used to mean those obtained by baking or frying in oil a dough, which have been prepared in advance by mixing wheat flour, bread yeast, water and the like as well as optionally other materials as required. It may also include those containing, besides the above materials, other grains than wheat flour, for example rye flour.

Specifically speaking, the term "bread" used herein includes not only pullman type (flat-top) loafbread, English type (open-top) loadbread, roll bread, milk bread, French bread, and butter roll, but also cake bread such as bread filled with various jams, buns filled with sweet bean paste, loafbread containing raisins, bread containing eggs and buns filled with cream paste, bread containing cereal flour other than wheat flour such as rye bread, rice bread, and unpolished rice bread and whole wheat flour bread, and those fermented by yeast such as rusk, cracker and steamed buns filled with various fillers such as bean paste or cooked meat and vegetable mixture.

The term "an L-ascorbic acid" used in this specification means to include L-ascorbic acid, dehydroascorbic acid or their salts. Such is incorporated in a dough at a proportion of 3-30 ppm of the weight of wheat flour, more suitably, 5-15 ppm. No desirable effect will be brought about with a proportion less than the above range, and no substantial increase in effect will be expected even if more L-ascorbic acid is added than the above range.

Among the dicarboxylic acids represented by the general formula (1), there are malic acid, α-ketoglutaric acid, tartaric acid, asparagic acid, glutamic acid, hydroxyoxalic acid, oxo-succinic acid, diamino-succinic acid, γ-hydroxyglutamic acid and their salts such as for example sodium salts and potassium salts. Asparagic acid, glutamic acid and tartaric acid are particularly preferred. Such a dicarboxylic acid is suitably added in a proportion of 5-60 ppm of the weight of wheat flour, more preferably 10-40 ppm.

Cystine or methionine can be suitably used in a proportion of 5-80 ppm, and more preferably 15-50 ppm, to the weight of wheat flour.

Suitable as an alum is potassium alum, burnt alum or burnt ammonium alum, which can be suitably used in a proportion of 10-60 ppm and more preferably 20-40 ppm to the weight of wheat flour. Such alums may be used jointly with a polymerized phosphate, such as potassium pyrophosphate, sodium pyrophosphate, potassium polyphosphate, sodium polyphosphate, potassium metaphosphate or sodium metaphosphate, which amounts to 3-60 ppm and preferably 5-30 ppm to the weight of wheat flour. It has been recognized that the additional use of such polymerized phosphate further promotes the effect attained by use of a L-ascorbic acid and an alum.

Among nicotinic acids suitable for the present invention are included nicotinic acid and the salts thereof and nicotinic acid amide. Such nicotinic acid in the general term is used in a proportion of 5-70 ppm and preferably 20-50 ppm.

In each case, no desirable effects will be seen below the lower limit of the respectively defined proportion. Beyond the upper limit of the proportion, the dough will become stickier and the volume of the dough will not be increased since the use of such an excess amount prevents the formation of gluten in the dough.

The above additives may be mixed and kneaded sufficiently during the kneading of a dough. If a sponge dough method is employed, it is preferable to add to the sponge dough at least either one of L-ascorbic acid and the other additive, and more preferably both of the additives.

According to the method of the present invention, it is possible to obtain bread of which volume is sufficiently large, and of which the inner phase (crumb grain, color of crumb), outer phase (color and nature of the crust) and texture (feeling obtained by pressing the texture with a finger) are satisfactory. In addition, the handling of the dough is easy as the dough is not excessively sticky. The effectiveness of such additives becomes more apparent where no oxidizing agent is employed in the dough.

The effectiveness of the present invention will now be described below.

Test 1

Various bread products were produced in accordance with a straight dough method by adding the additives in Table I to the below-described basic composition. The yeast food as referred to consists of calcium carbonate, calcium sulfate, ammonium chloride, calcium monophosphate, calcium diphosphate, malted rice, malt enzyme and starch.

| Basic composition | |
|---|---|
| Wheat flour | 300 g |
| Yeast | 6 g |
| Yeast food | 0.3 g |
| Sugar | 15 g |
| Salt | 6 g |
| Shortening | 12 g |
| Water | 219 cc |

TABLE I

| | Additives (each proportion is expressed in terms of amount per the weight of flour) | | | |
|---|---|---|---|---|
| | L-ascorbic acid (ppm) | Asparagic acid(ppm) | Glutamic acid (ppm) | mono Potassium tartrate (ppm) |
| Present invention (1) | 6 | 15 | — | — |
| Present invention (2) | 6 | — | 30 | — |
| Present invention (3) | 6 | — | — | 15 |
| Control (No additives) | — | — | — | — |
| Comparison (1) | 6 | — | — | — |
| Comparison (2) | 15 | — | — | — |

The bread products obtained were compared in volume, inner phase, outer phase and texture. The results are shown in Table II, in which each of the symbols denotes as follows:

TABLE II

| | Volume (cc) | Inner phase | Outer phase | Texture |
|---|---|---|---|---|
| Present invention (1) | 2030 | ○ | ○ | ◎ |
| Present invention (2) | 2010 | ○ | ○ | ○ |
| Present invention (3) | 2030 | ○ | ○ | ◎ |
| Control No additive) | 1890 | XXX | XXX | XXX |
| Comparison (1) | 1990 | XX | X | XX |
| Comparison (2) | 2000 | XX | X | XX |

◎ Very good
○ Good
X Slightly poor (of no commercial value)
XX Poor (of no commercial value)
XXX Very poor (of no commercial value)

Test 2

Various bread products were produced by a sponge dough method by combining a sponge of the below-described sponge dough formula with materials of the below-described dough formula and the additive indicated in Table III. The yeast food used was same as in Test 1.

| Sponge Formula | |
|---|---|
| Wheat flour | 1400 g |
| Yeast | 40 g |
| Yeast food | 2 g |
| Water | 800 cc |
| Dough formula | |
| Wheat flour | 600 g |
| Salt | 40 g |
| Sugar | 120 g |
| Margarine | 40 g |
| Shortening | 60 g |
| Powdered milk | 40 g |
| Water | 520 cc |

TABLE III

| | Additive | Sponge | Dough |
|---|---|---|---|
| Present invention (4) | Ascorbic acid | 10 | — |
| | L-cystine | 30 | — |
| Present invention (5) | Ascorbic acid | — | 10 |
| | L-cystine | 30 | — |
| Present invention (6) | Ascorbic acid | 10 | — |
| | L-cystine | — | 30 |
| Present invention (7) | Ascorbic acid | 20 | — |
| | DL-methionine | 45 | — |
| Control (No additive) | | — | — |
| Comparison (3) | Ascorbic acid alone | 10 | — |
| Comparison (4) | Cystine alone | 30 | — |

(Note)
All the amounts are expressed in terms of ppm to the weight of wheat flour.

The thus produced bread products were compared in volume, inner phase, outer phase and texture. The results are shown in Table IV, in which the symbols have the same denotation as defined above.

TABLE IV

| | Volume | Outer phase | Inner phase | Texture |
|---|---|---|---|---|
| Present invention (4) | 2140 | ○ | ○ | ◎ |
| Present invention (5) | 2090 | ○ | ○ | ○ |
| Present invention (6) | 2100 | ○ | ○ | ○ |
| Present invention (7) | 2070 | ○ | ○ | ○ |
| Control | 1900 | XXX | XXX | XXX |
| Comparison (3) | 1990 | X | XX | X |
| Comparison (4) | 1950 | X | XX | X |

Test 3

Various baked products were prepared by a straight dough method by adding the additives in Table V to the below-indicated basic composition.

| Basic composition | |
|---|---|
| Wheat flour | 300 g |
| Yeast | 6 g |
| Sugar | 9 g |
| Salt | 4.5 g |
| Shortening | 6 g |
| Water | 222 cc |

TABLE V

| | L-ascorbic acid | Ammonium alum | Sodium metaphosphate |
|---|---|---|---|
| Present invention (8) | 6 | 20 | 10 |
| Present invention (9) | 6 | 20 | — |
| Control | — | — | — |
| Comparison (5) | 6 | — | 10 |
| Comparison (6) | 6 | — | — |
| Comparison (7) | — | 20 | — |
| Comparison (8) | — | — | 10 |

The baked products thus obtained were compared in volume, inner phase, outer phase and texture. The results are shown in Table VI, in which the symbols have the same denotation as defined above.

TABLE VI

| | Volume (cc) | Inner phase | Outer phase | Texture |
|---|---|---|---|---|
| Present invention (8) | 1960 | ◎ | ○ | ◎ |
| Present invention (9) | 1910 | ○ | ○ | ○ |
| Control | 1780 | XXX | XXX | XXX |
| Comparison (5) | 1860 | XX | XX | XX |
| Comparison (6) | 1860 | XX | XX | XX |
| Comparison (7) | 1800 | XX | XXX | XX |

TABLE VI-continued

|  | Volume (cc) | Inner phase | Outer phase | Texture |
|---|---|---|---|---|
| Comparison (8) | 1790 | XX | XXX | XXX |

Test 4

Various baked products were produced by a sponge dough method by combining the sponge having the sponge formula of Test 2 and the dough of the dough making formula of Test 2 with the additives in Table VII.

TABLE VII

|  | Additive | Sponge | Dough |
|---|---|---|---|
| Present invention (10) | Ascorbic acid | 10 | — |
|  | Nicotinic acid | 40 | — |
| Present invention (11) | Ascorbic acid | 10 | — |
|  | Nicotinic acid | — | 40 |
| Present invention (12) | Ascorbic acid | — | 10 |
|  | Nicotinic acid | 40 | — |
| Control | (No additive) | — | — |
| Comparison (9) | Ascorbic acid alone | 10 | — |
| Comparison (10) | Nicotinic acid alone | 40 | — |

The baked products obtained were compared in volume, inner phase, outer phase and texture. The results are shown in Table VIII, in which the symbols have the same denotations as defined above.

TABLE VIII

|  | Volume | Inner phase | Outer phase | Texture |
|---|---|---|---|---|
| Present invention (10) | 1980 | ○ | ○ | ◉ |
| Present invention (11) | 1940 | ○ | ○ | ○ |
| Present invention (12) | 1920 | ○ | ○ | ○ |
| Control | 1800 | XXX | XXX | XXX |
| Comparison (9) | 1890 | X | XX | X |
| Comparison (10) | 1820 | XX | XXX | XX |

The present invention will now be described in more detail by way of examples.

EXAMPLE 1

Materials in the below-described sponge formula were kneaded and then to the thus kneaded dough 20 mg of L-ascorbic acid and 60 mg of asparagic acid were added and thereafter kneaded further. The thus obtained sponge was allowed to ferment at 27° C. for 4 hours. To the thus fermented sponge was added the mixture of the below-described dough formula and kneading was carried out.

Loaf bread was produced in accordance with the following bread-making conditions.

| Sponge formula | |
|---|---|
| Wheat flour | 1400 g |
| Bread yeast | 40 g |
| Yeast food | 2 g |
| Water | 800 cc |
| Dough formula | |
| Wheat flour | 600 g |
| Salt | 40 g |
| Sugar | 120 g |
| Margarine | 40 g |
| Shortening | 60 g |
| Powdered milk | 40 g |
| Water | 520 cc |
| Bread-making conditions | |
| Floor time | 20 minutes |
| Bench time | 20 minutes |
| Final Proof | 37° C., 35 minutes |
| Baking | 200° C., 30 minutes |

EXAMPLE 2

To the sponge of Example 1, was added and kneaded 14 mg of dehydro-ascorbic acid. The sponge was allowed to ferment for 4 hours at 27° C. To the sponge was added the mixture of the bread-making formula of Example 1 and 34 mg of sodium glutamate. After kneading the mixture and following the bread-making conditions of Example 1, loaf bread was obtained.

EXAMPLE 3

Materials in the below-described straight dough formula was kneaded and then to the thus kneaded dough 1.8 mg of L-ascorbic acid and 9 mg of L-cystine were added and thereafter kneaded further. The thus obtained dough was treated according to the bread-making conditions described below thereby to obtain loaf bread.

| Straight dough | |
|---|---|
| Wheat flour | 300 g |
| Yeast | 6 g |
| Yeast food | 0.3 g |
| Sugar | 15 g |
| Salt | 6 g |
| Shortening | 12 g |
| Water | 219 cc |
| Bread-making conditions | |
| First fermentation | 75 minutes at 27° C. |
| Second fermentation | 25 minutes at 27° C. |
| Final proof | 50 minutes at 35° C. |
| Baking | 35 minutes at 200° C. |

EXAMPLE 4

To a sponge of the below-indicated sponge formula 50 mg of dehydro-ascorbic acid and 150 mg of L-cystine were added. The resulting sponge dough was allowed to ferment for 4 hours at 25° C. To the mass, a mixture of the below-indicated dough formula was added and then kneaded further. The thus obtained dough was treated by following the bread-making conditions to obtain bean jam buns.

| Sponge formula | |
|---|---|
| Wheat flour | 3500 g |
| Yeast | 125 g |
| Yeast food | 5 g |
| Water | 1950 cc |
| Dough formula | |
| Wheat flour | 1500 g |
| Sugar | 750 g |
| Salt | 70 g |
| Shortening | 250 g |
| Defatted milk powder | 100 g |
| Water | 780 cc |
| Bread-making conditions | |
| Floor time | 10 minutes |
| Bench time | 15 minutes |
| Final Proof | 50 minutes at 38° C. |
| Baking | 10 minutes at 210° C. |

EXAMPLE 5

Materials in the straight dough formula of Example 3 were kneaded together, added with 3.0 mg of L-ascorbic acid and 13.5 g of DL-methionine, and then kneaded further. The resulting dough was treated by following the bread-making conditions of Example 3 thereby to obtain loaf bread.

EXAMPLE 6

To a sponge of the below-indicated sponge dough formula, 20 mg of L-ascorbic acid, 60 mg of ammonium alum and 30 mg of potassium metaphosphate were added and kneaded together. The resulting sponge was allowed to ferment for 4 hours at 27° C. To the thus obtained sponge, materials in the dough formula were added and kneaded together. The total dough was treated by following the below-indicated bread-making conditions thereby to obtain loaf bread. The yeast food as referred to below consists of calcium carbonate, calcium sulfate, ammonium chloride, calcium diphosphate, malted rice, malt enzyme and starch.

| Sponge formula | |
|---|---|
| Wheat flour | 1400 g |
| Yeast | 40 g |
| Yeast food | 2 g |
| Water | 800 cc |
| Dough formula | |
| Wheat flour | 600 g |
| Salt | 40 g |
| Sugar | 120 g |
| Margarine | 40 g |
| Shortening | 60 g |
| Milk powder | 40 g |
| Water | 520 cc |
| Bread-making conditions | |
| Floor time | 20 minutes |
| Bench time | 20 minutes |
| Final Proof | 50 minutes at 38° C. |
| Baking | 30 minutes at 200° C. |

EXAMPLE 7

To a dough of the straight dough formula of Example 3, 1.8 mg of dehydro-ascorbic acid, 7.5 mg of potassium alum and 9 mg of potassium pyrophosphate were added and kneaded together. The dough thus obtained was fermented and baked according to the below-indicated bread-making conditions thereby to obtain loaf bread.

| Bread-making conditions | |
|---|---|
| First fermentation | 90 minutes at 27° C. |
| Second fermentation | 30 minutes at 27° C. |
| Final Proof | 41 minutes at 35° C. |
| Baking | 35 minutes at 200° C. |

EXAMPLE 8

To a dough of the straight dough formula of Example 7, 3 mg of L-ascorbic acid and 10.5 mg of burnt alum were added. The dough was worked in the same way as in Example 7 thereby to obtain bread.

EXAMPLE 9

To a sponge of the sponge formula of Example 6, 25 mg of L-ascorbic acid and 50 mg of potassium alum were added and kneaded well. The sponge was allowed to ferment for 4 hours at 27° C., and then added with materials in the dough formula of Example 6 and sodium metaphosphate (20 mg). After kneading, the dough was treated by following the bread-making conditions of Example 6.

EXAMPLE 10

Materials in the straight dough of Example 3 were kneaded together, added with 2 mg of L-ascorbic acid and 6 mg of nicotinic acid amide, and then kneaded further. The resulting dough was treated by following the bread-making conditions as mentioned in Example 3, thereby to obtain loaf bread.

EXAMPLE 11

To a sponge of the below-indicated sponge formula, 50 mg of dehydro-ascorbic acid and 40 mg of nicotinic acid were added and then kneaded together. The resulting sponge was allowed to ferment for 4 hours at 25° C., and materials in the below-indicated dough formula were added thereto. After kneading, the total dough was treated by following the below-indicated bread-making conditions thereby to obtain pullman type bread.

| Sponge formula | |
|---|---|
| Wheat flour | 1400 g |
| Yeast | 40 g |
| Yeast food | 2 g |
| Water | 800 cc |
| Dough formula | |
| Wheat flour | 600 g |
| Sugar | 60 g |
| Glucose | 40 g |
| Salt | 40 g |
| Shortening | 80 g |
| Defatted milk powder | 40 g |
| Egg white | 40 g |
| Molt | 1 g |
| Water | 500 cc |
| Bread-making conditions | |
| Floor time | 10 minutes |
| Bench time | 15 minutes |
| Final Proof | 45 minutes at 37° C. |
| Baking | 40 minutes at 200° C. |

What we claim is:

1. A method for producing bread which comprises kneading a dough together with (a) 3 to 30 ppm of an additive selected from the group consisting of L-ascorbic acid, dehydroascorbic acid and salts thereof, and (b) 5 to 60 ppm of an additive selected from the group consisting of malic acid, α-ketoglutaric acid, tartaric acid, asparagic acid, glutamic acid, hydroxy-oxalic acid, oxo-succinic acid, diamino-succinic acid, γ-hydroxyglutamic acid and salts thereof; or 5 to 80 ppm of methionine; or 10 to 60 ppm of an alum; or 5 to 70 ppm of a nicotinic acid, wherein all amounts are based on the weight of wheat flour, allowing the thus kneaded dough to ferment, and then baking the thus fermented dough.

2. A method according to claim 1, wherein said additive (b) is one member selected from the group consisting of potassium alum, burnt alum and burnt ammonium alum.

3. A method according to claim 2, wherein a polymerized phosphate is further incorporated as an additional additive into the dough.

4. A method according to claim 3, wherein said polymerized phosphate is one member selected from the group consisting of potassium pyrophosphate, sodium pyrophosphate, potassium polyphosphate, sodium polyphosphate, potassium metaphosphate and sodium metaphosphate, and it is used in an amount of 3 to 60 ppm to the weight of wheat flour.

5. The method according to claim 1, wherein said additive (b) is one member selected from nicotinic acid and the salts thereof and nicotinic acid amide.

6. A method according to claim 1 wherein said L-ascorbic acid, dehydroascorbic acid or their salts is incorporated into the dough in the proportion of 5 to 15 ppm to the weight of the wheat flour.

7. A method according to claim 1, wherein said additive (b) is one member selected from the group consisting of malic acid, α-ketoglutaric acid, tartaric acid, asparagic acid, glutamic acid, hydroxy-oxalic acid, oxo-succinic acid, diamino-succinic acid, γ-hydroxy-glutamic acid and their salts, and it is incorporated into the dough at the proportion of 10 to 40 ppm to the weight of wheat flour.

8. A method according to claim 1, wherein said additive (b) is methionine and it is incorporated into the dough at the proportion of 15 to 50 ppm to the weight of wheat flour.

9. A method according to claim 2, wherein said additive (b) is one member selected from the group consisting of potassium alum, burnt alum and burnt ammonium alum, and it is incorporated into the dough at the proportion of 20 to 40 ppm to the weight of wheat flour.

10. A method according to claim 9, wherein a polymerized phosphate is further incorporated as an additional additive into the dough.

11. A method according to claim 4, wherein said polymerized phosphate is one member selected from the group consisting of potassium pyrophosphate, sodium pyrophosphate, potassium polyphosphate, sodium polyphosphate, potassium metaphosphate and sodium metaphosphate, and it is used in an amount of 5 to 30 ppm to the weight of wheat flour.

12. A method according to claim 5, wherein said additive (b) is one member selected from nicotinic acid and the salts thereof and nicotinic acid amide, and it is incorporated into the dough at the proportion of 20 to 50 ppm to the weight of wheat flour.

13. A method according to any one of the preceding claims, which method is carried out according to a sponge dough method or a straight dough method.

* * * * *